(No Model.)
A. D. SIMPSON.
SEED PLANTER AND FERTILIZER DISTRIBUTING ATTACHMENT FOR PLOWS.
No. 533,924. Patented Feb. 12, 1895.
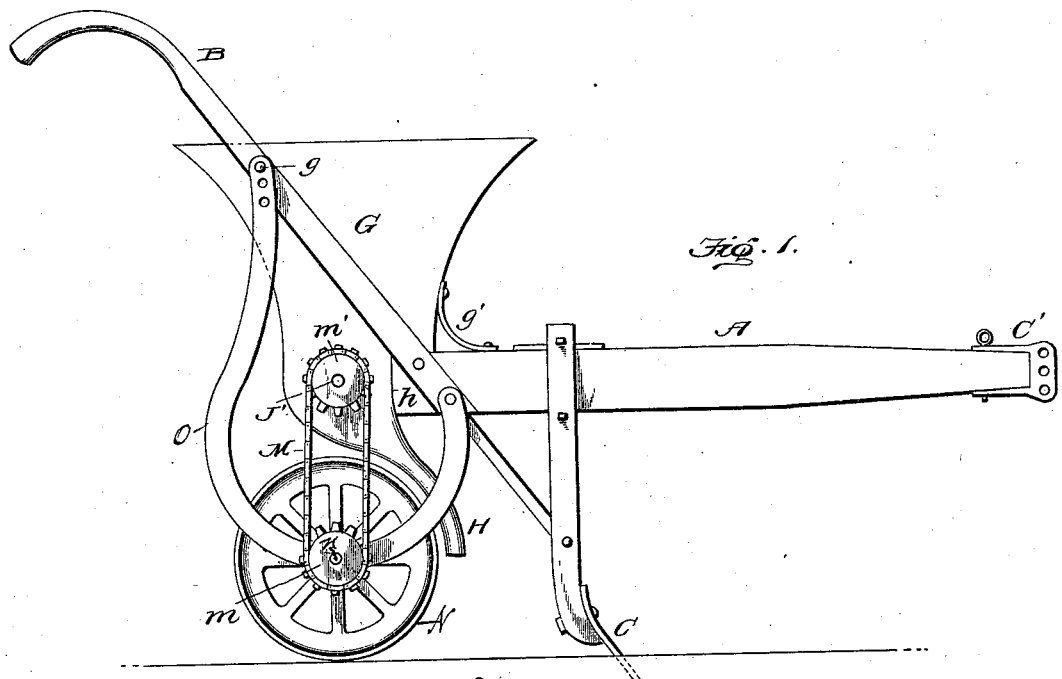
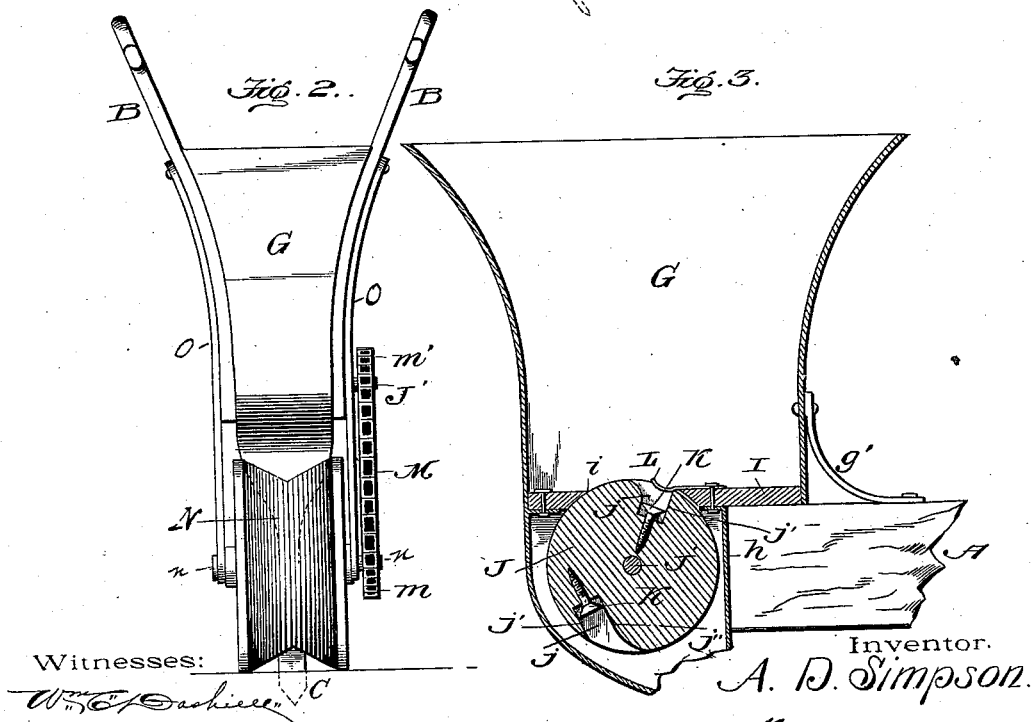
Witnesses:
Inventor.
A. D. Simpson.
Edson Bros.
Attorneys

UNITED STATES PATENT OFFICE.

ALEXANDER D. SIMPSON, OF GADSDEN, ALABAMA.

SEED-PLANTER AND FERTILIZER-DISTRIBUTING ATTACHMENT FOR PLOWS.

SPECIFICATION forming part of Letters Patent No. 533,924, dated February 12, 1895.

Application filed August 7, 1894. Serial No. 519,681. (No model.)

*To all whom it may concern:*

Be it known that I, ALEXANDER D. SIMPSON, a citizen of the United States, residing at Gadsden, in the county of Etowah and State of Alabama, have invented certain new and useful Improvements in Seed-Planters and Fertilizer-Distributing Attachments for Plows; and I do hereby declare the following to be a full, clear, and exact description of the invention, such as will enable others skilled in the art to which it appertains to make and use the same.

My invention relates to a planting or fertilizer distributing attachment for any form of plow or cultivator known to the art, using a beam and handles, and the object that I have in view is to provide a simple, cheap and efficient attachment for a plow by which various kinds of seed may be planted or a fertilizer may be distributed as the plow is drawn through the furrows.

My planter can be used for any kind of seeds, such as sorghum, broom corn, turnips, corn and beans, although for planting seed wheat the attachment may be built in as a part of a distinct type of machine; but for general convenience to the farmer and agriculturist, the planter is made in the form of an attachment to a common plow or cultivator by constructing the hopper and conducting spout to fit snugly against the rear end of the beam and between the handles of the implement, and by combining therewith a dropping wheel carried by a horizontal axle and arranged to rotate in a vertical plane, said dropping wheel being provided with spaced pockets which, as the wheel is rotated by connection with a ground wheel, receive the seed or fertilizer from the hopper and deposit the same into the conducting spout, from whence the seed or fertilizer is deposited on the ground.

The invention further consists in the construction and combination of parts which will be hereinafter fully described and claimed.

To enable others to more readily understand my invention, I have illustrated the preferred embodiment thereof in the accompanying drawings, forming a part of this specification, and in which—

Figure 1 is a side elevation of my seeder or distributer attached to a common plow, and Fig. 2 is a rear elevation thereof. Fig. 3 is an enlarged detail sectional view taken centrally through my distributer designed for planting seed or distributing fertilizer.

Like letters of reference denote corresponding parts in all the figures of the drawings, referring to which—

A designates the beam, B the handles, C the foot or stock, and C' the clevis, of any kind of a plow or cultivator known to those skilled in the art to which this invention relates; and as no novelty is herein claimed for such devices, I do not deem it necessary to more particularly refer thereto.

In the preferred embodiment of my invention the hopper G is constructed to fit between the handles B of the plow or cultivator, and the spout H of the hopper is arranged in such relation to the bottom I of said hopper, that a space is produced which will receive the rear squared end of the beam A, whereby the hopper and spout are made to fit snugly to the beam.

The hopper is preferably made of sheet metal, such as galvanized iron, although any other material suitable for the purpose may be used, and the side and end walls of the hopper are curved or so shaped that they lie or fit snugly between and to the handles B, as shown by Figs. 1 and 2, the hopper near its upper end being secured to the handles by the bolts $g, g$, and being fastened on the beam by the bracket $g'$, which has its respective ends bolted or otherwise fastened to the front of the hopper and to the beam. See Figs. 1 and 3.

The bottom I of the hopper is made of wood or metal, and it is suitably secured in place within the hopper. In this bottom I of the hopper is cut or formed a hole or opening $i$, and the vertical dropping disk or wheel J is journaled so that a part of its periphery fits snugly against the bottom I and projects somewhat through the opening $i$. See Fig. 3.

The conducting spout H of the seeder may be made separate from and be attached to the hopper G, or the rear and side walls of the hopper may be so constructed and shaped as to form the spout, which it will be noted, is tapered from its upper to its lower end and is curved forward to lie below the beam A and in advance of the ground wheel; but the front wall h of the spout is attached to the bottom I at a point between its opening i and the front wall of the hopper so that the front h of the spout and the bottom I of the hopper produce the cavity or space at the front bottom side of the hopper, into which space the rear angular end of the beam A is received, whereby the hopper and spout are made to fit snugly upon the beam A of the implement.

The dropping wheel J is made or cast in a single piece with a series (two or more) of pockets j. These pockets extend radially from the axis of the wheel, and one side j' of each pocket extends squarely to the edge of the wheel while the opposite wall j'' is curved or flared, as shown by Fig. 3, as it merges into the surface of the wheel, whereby the contents of the disk are retained in the pockets against spilling until the pocket is inverted to dump its contents into the spout H. The depth of the pocket in the wheel may be regulated by means of the adjustable follower or bottom K, which is preferably made by using a headed screw, the shank of which works in the disk or wheel J.

A leaf spring L is attached to the bottom I inside of the hopper, and the free end of this spring projects over the edge of the opening i so as to bear upon the dropping disk J, said spring serving to prevent the seed from being cut in the hopper as the disk or wheel J revolves therein. The shaft J' of this dropping wheel is journaled in suitable bearings provided in the spout H, and one end of this shaft is extended through the spout, to receive the sprocket wheel m', around which passes an endless sprocket chain M, that extends below and around a similar sprocket wheel m on one end of the shaft n of the ground wheel N. The shaft of the ground wheel N is journaled in suitable bearings provided in the frame O which consists of two curved bars or plates which are attached at their respective ends to the beam A and to the handles B. See Fig. 1.

This being the construction of my improved seeder or distributer, the operation may be described as follows: The seed or guano is placed in the hopper, and as the machine is drawn over the ground, the wheel N is rotated and motion transmitted to the shaft J' to rotate the dropping wheel J. As each pocket j is carried up through the bottom I on the rotation of the wheel, the seed or guano in the hopper is deposited in the pocket so as to fill the latter (the size of which is regulated by the adjustable follower) and as the wheel J continues to turn, the filled pocket is turned or inverted, to dump the seed or fertilizer into the spout H, from whence it is deposited in the ground in advance of the ground wheel N.

By using wheels or disks J of different sizes, my distributer can be adapted for planting different kinds of seeds or for distributing fertilizer, and when seed is being planted, the spring prevents them from dropping between the edge of the bottom I and the edge of the dropping disk so that they are not likely to be cut and destroyed.

I am aware that changes in the form and proportion of parts and in the details of construction of the mechanism herein shown and described as an embodiment of my invention can be made by a skilled mechanic without departing from the spirit or sacrificing the advantages of my invention, and I therefore reserve the right to make such modifications and alterations as fairly fall within the scope of my invention.

Having thus fully described my invention, what I claim as new, and desire to secure by Letters Patent, is—

1. A seed planter and fertilizer distributer attachment for plows comprising the hopper having the bottom I thereof and the spout H arranged to receive the rear end of the beam, combined with a ground wheel journaled in a suitable frame, and a dropping disk journaled in the spout and working in a hole in the said bottom, substantially as and for the purposes described.

2. A seed planter and fertilizer distributing attachment for plows, comprising the hopper having the bottom I provided with the opening i, and the spout H having its front wall h attached to the bottom I at a point between the opening i therein and the front wall of the hopper, thereby forming a space to receive the rear end of a plow beam, combined with a dropping disk having the pockets j and journaled in the spout to fit in the opening i of the bottom, and a ground wheel geared to the shaft of the dropping disk, substantially as described.

3. The combination with a beam, and the handles, of the hopper G fitted between the handles and upon the rear end of the beam, means for fastening the hopper to said beam and the handles, the pendent spout, H, secured to the bottom of the hopper, at a short distance back of the front side thereof, to form with the hopper a recess to receive the rear end of the beam against which the spout bears, the bars, O, attached to the beam and the handles, a ground wheel journaled in said bars O, the dropping disk journaled in the spout, and gearing between the ground wheel and the dropping disk, substantially as described.

In testimony whereof I affix my signature in presence of two witnesses.

A. D. SIMPSON.

Witnesses:
JAMES G. THOMSON,
ROBT. CAMPBELL.